UNITED STATES PATENT OFFICE.

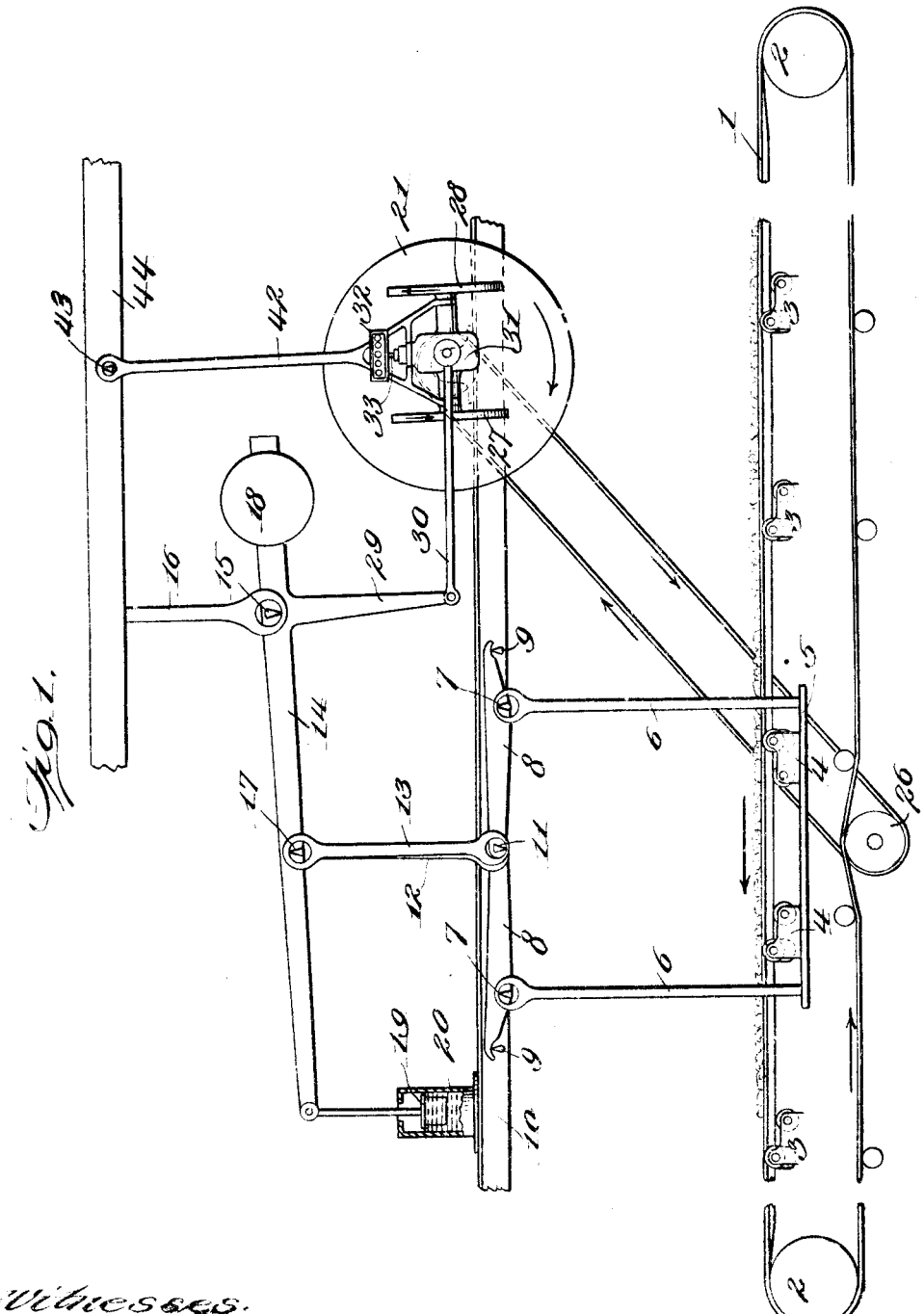

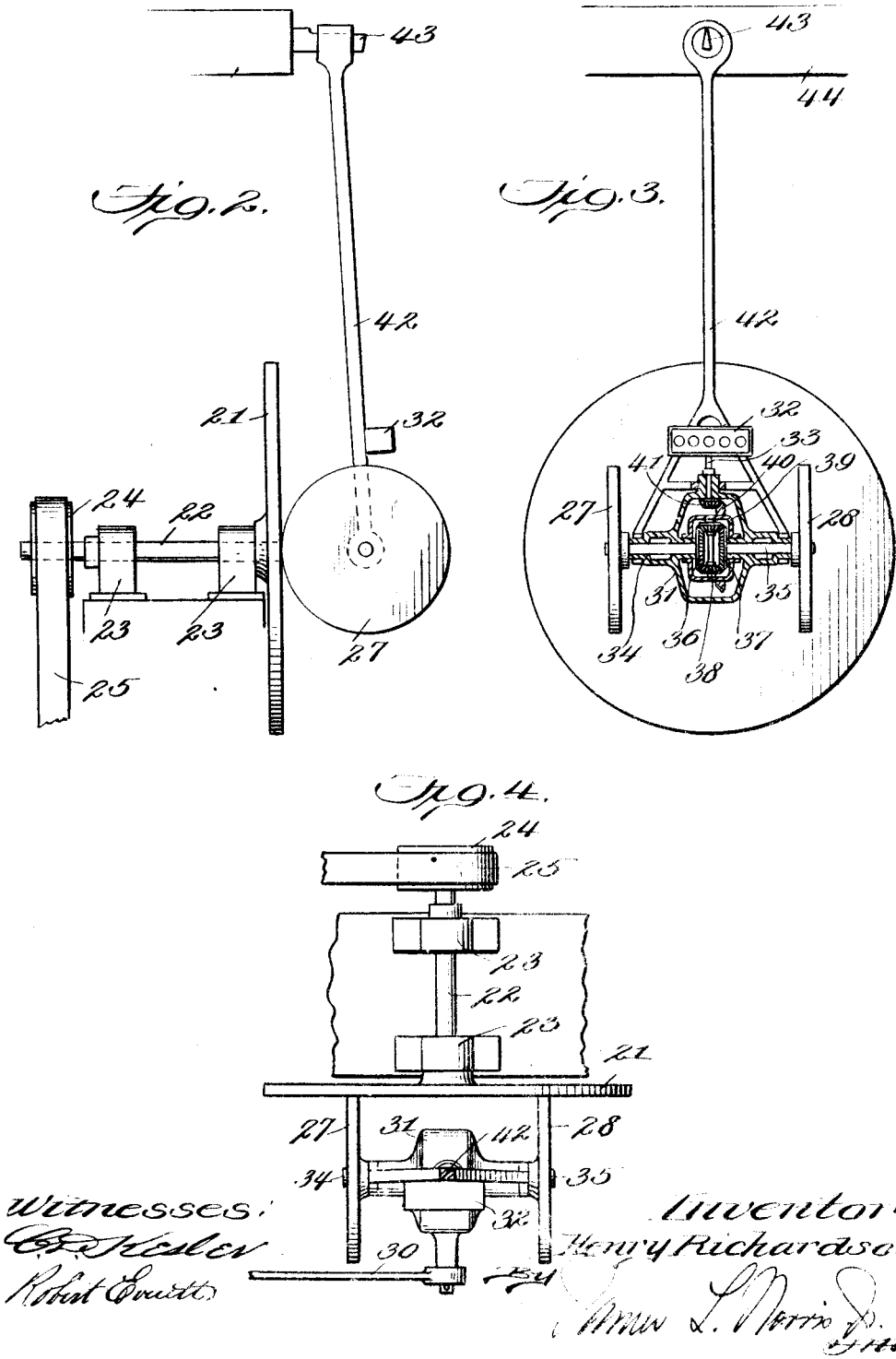

HENRY RICHARDSON, OF NEW YORK, N. Y.

AUTOMATIC TRAVELING-LOAD SCALE.

1,072,500.

Specification of Letters Patent.

Patented Sept. 9, 1913.

Application filed March 24, 1910. Serial No. 551,347.

*To all whom it may concern:*

Be it known that I, HENRY RICHARDSON, a subject of the King of Great Britain, residing at New York, in the county and State of New York, have invented certain new and useful Improvements in Automatic Traveling-Load Scales, of which the following is a specification.

My present invention relates to improvements in weighing machines of the type adapted to weigh materials or objects while traveling along a belt or other form of conveyer, and it has for its object to provide a simple, improved and efficient integrating mechanism which will accurately totalize or register the weight of moving materials or objects in accordance with the speed of movement of such material and the varying weight thereof as they pass a given point.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a side elevation of a weighing machine embodying an integrating mechanism constructed in accordance with the present invention, a belt conveyer being shown conventionally; and Figs. 2, 3 and 4 are detail enlarged views of the integrating mechanism, Fig. 3 showing such mechanism in section.

Similar parts are designated by the same reference characters in the several views.

Integrating mechanism constructed in accordance with the present invention is capable of use generally in connection with weighing machines for determining the weight of materials or objects passing over a conveyer whether this conveyer be in the form of the ordinary traveling belt or whether such conveyer is in the form of traveling vehicles or conveyances for the material to be weighed. In the accompanying drawing, I have shown the integrating mechanism in connection with a weighing machine and conveyer of one particular type. It will be understood, however, that this part of the apparatus is shown in the drawing essentially as an example and that I contemplate applying the integrating mechanism to weighing machines and conveyers of such forms as may prove practical.

In the present instance, the material in bulk or the articles or objects to be weighed, is or are carried by a conveyer which is in the form of an endless traveling belt 1 which passes over suitable pulleys or sprockets 2 and is provided upon its upper stretch with idlers 3 which may be of the well known form that give the belt a trough shape in order that the belt may properly carry the material. One or more of the idlers which support the upper stretch of the belt or conveyer is or are supported by a weighing mechanism. In the present instance, a pair of the idlers 4 rests upon a weighing table or platform 5, the latter being suspended by a suitable number of rods 6, and these rods in turn are provided at their upper ends with bearings which rest upon the knife-edges 7 formed upon opposed weigh beams 8, these weigh beams being fulcrumed upon the knife-edges 9 fixed to a suitable stationary frame or support 10, and the inner ends of the weigh beams 8 are provided with knife-edges 11 which rest upon separate links 12 and 13. The main beam 14 is provided with a knife-edge 15 which is fulcrumed in a bearing provided in suitable stationary hanger 16, and this main beam 14 is provided with a knife-edge 17 which supports the links 12 and 13. This main beam 14 carries a counterweight 18 at one side of the knife-edge 15 while its opposite end may be provided with a displacement member 19 which member may operate within a cylinder 20 containing a suitable liquid.

The material traveling along with the conveyer will exert a downward pressure upon the table or platform 5 which is proportionate to the weight of such material, the depression of the table or platform causing a corresponding oscillation of the main beam 14. The integrating mechanism which I have provided is controlled in accordance with the degree of oscillation of the main beam 14 due to the depression of the weighing table or platform and also in accordance with the speed or rate of movement of the material as it travels with the conveyer. In the present instance, this integrating mechanism comprises a revoluble member in the form of a disk 21, the shaft 22 of which is journaled in bearings 23 which are secured to the frame 10 or any other rigid stationary support, and this disk or wheel 21 is revolved at a speed proportionate to the rate of movement of the conveyer. In the present instance, the driving of the disk in such manner is effected by a pulley 24, a belt or chain 25 coöperating therewith and an idler 26 which is driven by the conveyer, it being shown in the present instance as coöperating directly with the under side of the conveyer. A pair of integrating wheels 27 and 28 have a frictional contact with the flat face of the disk 21, such wheels when the weighing mechanism is in zero or "no-load" position being spaced equidistantly from the center or axis of rotation of the disk 21 so that these two wheels will revolve at equal speed but in opposite directions. Any suitable means may be provided for controlling the position of the wheels 27 and 28 with respect to the center or axis of rotation of the disk 21, the main beam 14 being provided in the present instance with a rigid arm 29, and a link 30 is pivotally attached to the arm 29 and is operatively connected to a casing 31 which carries such wheels.

According to the present invention, a counter is provided which is operated at a rate that will be determined by the difference in speed of rotation of the wheels 27 and 28, the counter of course being at rest when such wheels are equidistantly spaced from the center or axis of rotation of the disk 21 at which time the wheels 27 and 28 will revolve at the same speed but in opposite directions. In the present instance, I provide an ordinary form of counter 32 which is actuated by a shaft 33 and this shaft in turn is actuated by a differential gear connection between the wheels 27 and 28. In the present instance, the wheels 27 and 28 are provided with individual shafts 34 and 35 which are arranged in axial alinement and are journaled in the casing 31. The differential connection between the shafts 34 and 35 may be of different forms, that shown embodying opposed gears 36 and 37 which are of equal diameter and are fixed to the respective shafts, and a suitable number of planetary gears 38 which are carried by a frame or casing 39 which is rotatable about the shafts 34 and 35 as an axis, this frame or casing being provided with a gear surface 40 which coöperates with a pinion 41 fixed to the counter-actuating shaft 33. The casing 31 is suspended by a frame 42, such frame being hung preferably from a knife-edge 43 which is fixed to an appropriate stationary support 44.

The operation of a mechanism constructed in accordance with the present embodiment of my invention may be briefly described as follows: The material to be weighed is conveyed from one point to another upon the traveling conveyer which it will be understood may be of different forms. A portion of this conveyer passes over the weighing table or platform of the weighing machine and this table or platform will be depressed to different degrees proportionate to the amount or mass of the material which is carried over the table or platform by the conveyer, the platform or table being counterbalanced or supported by the counterpoise 18. The actuating disk or wheel 21 of the integrating mechanism is driven at a speed proportionate to the rate of movement of the material which travels with the conveyer, the integrating disk being preferably driven directly from the conveyer in order to maintain this relation. The integrating wheels, as previously stated, will be spaced equidistantly at opposite sides of the center or axis of rotation of the disk 21 when there is no load passing over the weighing table or platform. At such times there will be no resultant motion of the counter-actuating shaft because of the differential gear connection between the integrating wheels 27 and 28 which wheels will then revolve at the same speed and in reverse directions. The depression of the weighing table or platform, however, will oscillate the main weigh beam 14 and the latter will act through the rigid arm 29 thereon and the link 30 to shift the integrating wheels bodily to an eccentric position with respect to the axis of rotation of the disk 21, the eccentricity of the integrating wheels being dependent upon the degree to which the weighing table or platform is depressed. The eccentric position of the integrating wheels with respect to the disk 21 will cause one of the wheels (the wheel 27 in the present instance) to revolve slower owing to its proximity to the center of the disk 21 than the wheel 28 which is at a greater distance from the axis of rotation of this disk, the wheel 28 necessarily following a path of a greater radius. The difference in the speed of rotation between the two integrating wheels will cause, through the differential gear, a resultant motion of the counter-actuating shaft 33. The counter, therefore, will be operated at a rate proportional to the rate of movement of the material on the conveyer and also proportional to the weight of material on the conveyer as such material passes over the weighing table or platform.

Integrating mechanism constructed in accordance with my present invention is capable of operating efficiently and accurately to continuously totalize or register the weight of materials of various kinds as they travel with a conveyer or other moving vehicle, and the construction of the integrating mechanism is such that it is relatively inexpensive and it is not delicate or liable to become deranged by ordinary service.

I claim as my invention:

1. Integrating mechanism for traveling load scales embodying a member having means for driving it at a speed proportionate to one of the factors to be integrated, a pair of integrating wheels coöperative with said member and having means controlled to vary their relation with said member in accordance with the other factor to be integrated, and a totalizing device having means for actuating it from said integrating wheels at a rate proportionate to the difference in speed of revolution of said wheels.

2. Integrating mechanism for traveling load scales embodying a revoluble member having means for driving it at a speed proportionate to one of the factors to be integrated, a pair of integrating wheels coöperative with said member and having means controlled to vary their relation with respect to said member in accordance with the other factor to be integrated, a differential connection between said wheels, and a totalizing device actuated by said differential connection.

3. Integrating mechanism for traveling load scales embodying a revoluble disk having means for driving it at a speed which is constantly proportionate to one of the quantities to be integrated, a pair of integrating wheels coöperative with said disk at opposite sides of its axis of rotation and having means for shifting their position with respect to said axis of rotation, a differential gear operatively associated with said integrating wheels, and a counter actuated by said differential gear.

4. Integrating mechanism embodying a revoluble disk having means for driving it at a speed which is a factor of the quantity to be integrated, a pair of integrating wheels of equal diameter frictionally engaging the face of said disk at opposite sides of its axis of rotation, means controlled by another factor of the quantity to be integrated for bodily shifting said integrating wheels with respect to the axis of the disk, a differential gear operatively connecting said wheels, a counter, and an actuating shaft for the counter connected to be driven by said differential gear at a rate proportionate to the difference in speed of revolution of such integrating wheels.

In testimony whereof I have hereunto set my hand in presence of two subscribing witnesses.

HENRY RICHARDSON.

Witnesses:
  ISABEL HASBROUCK,
  PETER VANDERHOEFF.